United States Patent [19]

Lee

[11] Patent Number: 4,701,260
[45] Date of Patent: Oct. 20, 1987

[54] DEVICE FOR CONTINUOUS SEPARATION OF SOLID PARTICLES FROM A LIQUID SUSPENSION

[76] Inventor: Hyosong M. Lee, Malmvägen 20, S-147 00 Tumba, Sweden

[21] Appl. No.: 899,963

[22] Filed: Aug. 25, 1986

[30] Foreign Application Priority Data

Sep. 6, 1985 [SE] Sweden ................. 8504151

[51] Int. Cl.$^4$ ............................................. B01D 45/10
[52] U.S. Cl. .................................. 210/521; 210/526; 210/802
[58] Field of Search ............... 210/521, 522, 526, 802, 210/803, 519

[56] References Cited

U.S. PATENT DOCUMENTS

| | | | |
|---|---|---|---|
| 3,511,383 | 5/1970 | Clyne | 210/526 |
| 3,886,064 | 5/1975 | Kosonen | 210/522 |
| 3,923,659 | 12/1975 | Ullrich | 210/521 |
| 4,290,898 | 9/1981 | von Hagel et al. | 210/522 |
| 4,351,733 | 9/1982 | Salzer et al. | 210/521 |

FOREIGN PATENT DOCUMENTS

| | | | |
|---|---|---|---|
| 2378550 | 9/1978 | France | 210/521 |
| 55-41125 | 10/1980 | Japan | 210/521 |
| 55-42848 | 11/1980 | Japan | 210/526 |

*Primary Examiner*—Benoit Castel
*Attorney, Agent, or Firm*—Young & Thompson

[57] ABSTRACT

The invention relates to a device for continuous separation of solid particles from a liquid suspension. The device comprises a tank with a separator space. According to the invention, the tank has a horizontal bottom portion located under a lamella separator, and the solids discharge device is an endless scraper conveyor arranged to remove solid particle sludge collected on the bottom of the tank. The conveyor has a portion running along an inclined wall of the tank, along which transverse scraper elements on the conveyor are arranged to slowly push the sludge up above the liquid surface in the tank to then dewater the sludge before it is fed out through a sludge outlet.

7 Claims, 4 Drawing Figures

DEVICE FOR CONTINUOUS SEPARATION OF SOLID PARTICLES FROM A LIQUID SUSPENSION

BACKGROUND OF THE INVENTION

The present invention relates to a device for continuous separation of solid particles from a liquid suspension, comprising a tank with a separator space, into which an inlet leads for the liquid suspension containing solid particles, said space having firstly a primary separation zone where the larger solid particles can precipitate to a bottom portion of the tank, and secondly a secondary separation zone located downstream of the primary zone and containing a lamella separator unit for further separation of solid particles from the liquid flow on its way towards an outlet, the lamella separator being arranged so that the particles caught therein can also precipitate to the bottom portion of the tank, said device also comprising a means for feeding out the solid particle sludge collected on the bottom portion of the tank.

When separating solid particles from a liquid suspension in a tank equipped with a lamella separator, problems often arise in handling the sludge which accumulates at the bottom of the tank. Since such sludge has a high liquid content, additional equipment is normally required to dewater the sludge. The sludge can for example be removed from the tank through a bottom valve and be pumped to a separate filter chamber press where the water is removed. This treatment process is time-consuming and expensive.

Feed-out conveyors have been suggested running along an inclined bottom wall of the separation tank to lift out and dewater the sludge during conveyance to an upper outlet. Examples of such devices are described in GB No. -A-474 152 and SE No. -A-7606479-9. Due to the inclined bottom wall, these devices have a relatively great height in relation to their separating capacity, and this can often present installation problems.

SUMMARY OF THE INVENTION

According to the present invention, a device is suggested which has low height and provides high separation capacity in two stages as well as an efficient removal and dewatering of sedimented sludge. The degree of dewatering is determined primarily by proper selection of the speed of the scraper elements and the distance between the liquid surface and the sludge outlet. A suitable speed is on the order of a few centimeters per minute.

According to a suitable further development of the invention, the inlet consists of a pipe arranged on the underside of the lamella separator, said pipe leading into a distributor drum arranged to direct the incoming liquid suspension up towards the region of the tank where the scraper conveyor emerges from the liquid surface in the tank. Direct separation of lighten particles is thereby facilitated in the region of the tank where the conveyor leaves the primary separation zone.

BRIEF DESCRIPTION OF THE DRAWINGS

The invention will be described below in more detail with reference to the accompanying drawings.

DESCRIPTION OF THE PREFERRED EMBODIMENTS

Figure 1:
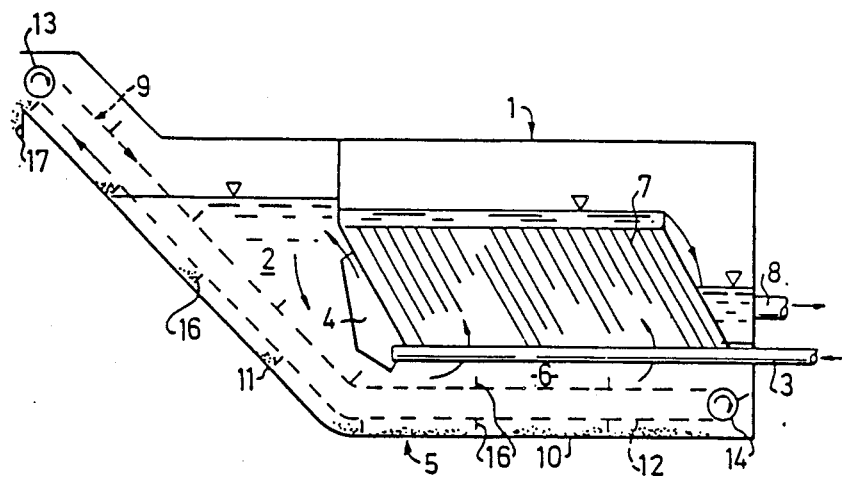
FIG. 1 is a schematic longitudinal section of a first embodiment of the device according to the invention.

The separating device shown in FIG. 1 comprises a tank 1 with a separation space for a liquid mixed with solid particles to be separated out. The separation space comprises a primary separation zone 2 into which the contaminated liquid is fed through an inlet pipe 3 via a distributor drum 4 which evenly distributes the liquid over the entire width of the separator device. The flow velocity drops at the same time to a suitable low level so as not to disturb the subsequent separation and sludge conveyance processes. The contaminated liquid is directed by the distributor chamber 4 obliquely upwards to the left so that lighter particles can be separated out directly by a scraper conveyor arranged in the tank, as will be described below.

In the primary separation zone 2 larger solid particles are caused to sink to the bottom 5 of the tank 1 as the liquid slowly flows downwards and backwards towards a secondary separation zone 6, where a lamella separator unit 7 (of a design which is known per se) is arranged, whereby the liquid flow is turned upwards and there is an additional separation of solid particles from the liquid as it flows towards the outlet 8. The solid particles caught in the lamella separator 7 precipitate gradually down to the bottom 5 of the tank 1 and form sludge there.

To feed the sludge out of the tank 1, an endless scraper conveyor 9 is arranged along the horizontal bottom portion 10 of the tank and its inclined wall 11. The conveyor comprises for this purpose a pair of endless chains 12 along the longitudinal walls of the tank. These chains run over sprockets 13 and 14 at the ends of the conveyor and are driven by a motor 15. Transverse scraper elements 16 extend between the chains 12 and are evenly spaced along the chains. They can, for example, be suitable angle profiles of steel. The scraper elements 16 on the lower run of the conveyor are in contact with the tank bottom and push the sludge containing the solid particles along the horizontal bottom portion 10 and up the inclined wall 11. As can be seen in FIG. 1, the inclined wall 11 continues somewhat above the liquid level in the tank. Over this portion of the wall 11 there takes place a dewatering of the sludge carried by the scraper elements 16. The sludge leaves the separator device through a sludge outlet 17 in a relatively viscous unpumpable state.

Figure 3:
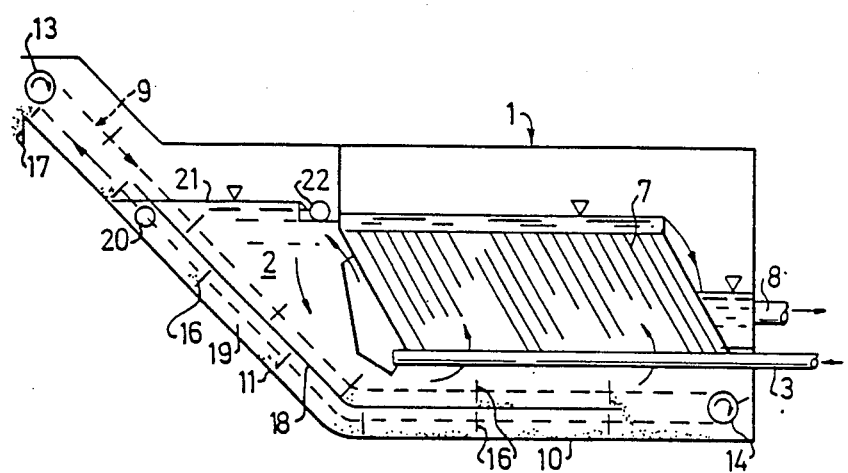
FIG. 3 is a schematic longitudinal section of a second embodiment of the device according to the invention.
Figure 4:
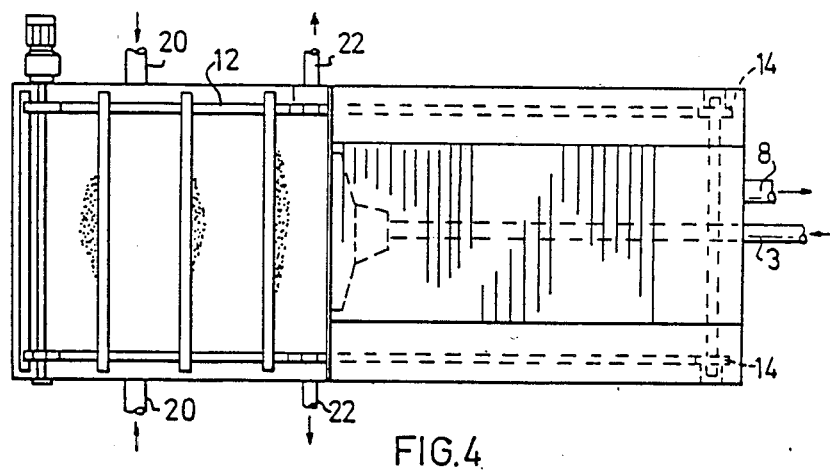
FIG. 4 is a plan view of the embodiment shown in FIG. 3.

FIGS. 3 and 4 show an embodiment of the separation device according to the invention which is particularly suited to the separation of metallic waste products, which one desires to recycle but which are contaminated by oil or other liquids for example. This can be the case, for example, in engineering industries where coolant liquids can contain valuable waste shavings from machining operations or in dressing and rolling processes in the iron and steel industry. Known equipment used for washing and purifying such contaminated waste products is complicated and often too expensive to make washing of waste products economically profitable.

Figure 2:
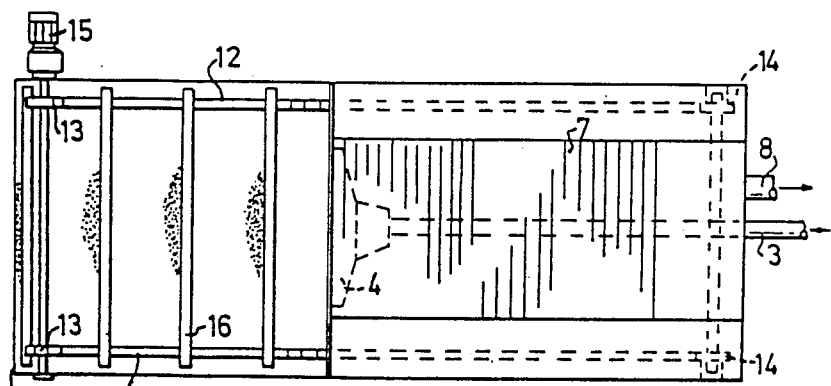
FIG. 2 is a plan view of the embodiment in FIG. 1.

This problem can be solved by simply modifying the device shown in FIGS. 1 and 2 to that in FIGS. 3 and 4. As can be seen in FIG. 3, an intermediate wall 18 is arranged between the upper and lower runs of the conveyor 9. This wall 18 extends from above the liquid level in the primary separation zone 2 to the vicinity of the sprocket 14. This creates an undisturbed sludge channel 19 between, on the one hand, the inclined wall 11 and the bottom portion 10 and, on the other hand, the intermediate wall 18, so that the sludge can be rinsed with clean liquid before leaving the sludge channel 19.

The working sequence in this embodiment is as follows: The contaminated waste products to be cleaned and recycled, are collected in a washing liquid and pumped in through the inlet pipe 3 into the separator tank. Solid particles precipitated onto the intermediate wall 18 are first pushed by the scraper elements 16 towards the sprockets 14 and fall down onto the bottom 10, whereafter the sludge is pushed by the scraper elements 16 in the opposite direction in the sludge channel 19 towards the outlet 17. The washing liquid used in the cleaning process is cleaned in the lamella separator 7 and can be pumped from the outlet 8 to the inlet 20 into the upper portion of the sludge channel for rinsing the cleaned sludge with clean liquid before the sludge is dewatered and fed out of the separator device. The oil which is removed in the process floats up to the surface 21 and runs out from the separator device through outlet pipe 22.

I claim:

1. Device for continuous separation of solid particles from a liquid suspension, comprising a tank with a separator space, into which an inlet leads for the liquid suspension containing solid particles, said space having firstly a primary separation zone where the larger solid particles can precipitate to a bottom portion of the tank, and secondly a secondary separation zone located downstream of the primary zone and containing a lamella separator unit for further separation of solid particles from the liquid flow on its way towards an outlet, the lamella separator being arranged so that the particles caught therein can also precipitate to the bottom portion of the tank, said device also comprising a means for feeding out the solid particle sludge collected on the bottom portion of the tank, said tank having a substantially horizontal bottom portion, located under the lamella separator unit and the secondary separation zone, and an inclined portion located under the primary separation zone, said feed-out means comprising an endless scraper conveyor which has a portion running along the horizontal bottom of the tank and a portion running along the inclined portion, transverse scraper elements on the conveyor being arranged to slowly push the sludge along the bottom and inclined portions up above the liquid surface in the tank and there dewater the sludge before it is fed out through an outlet located higher up, said inlet leading into a distributor drum arranged to direct the incoming liquid suspension up toward the region of the primary separation zone of the tank where the scraper conveyor emerges from the liquid surface in the tank.

2. Device according to claim 1 characterized in that an intermediate wall is arranged between the upper and lower runs of the endless scraper conveyor to form a protected sludge channel with the bottom of the tank.

3. Device according to claim 2, characterized in that the intermediate wall extends from a point above the liquid surface in the tank to a point in the vicinity of the end of the conveyor down in the tank.

4. Device according to claim 2, characterized in that the scraper elements on the upper run of the conveyor are arranged to be in contact with the topside of the intermediate wall, while the scraper elements on the lower run of the conveyor are arranged to be in contact with the horizontal bottom portion and the inclined wall portion of the tank.

5. Device according to claim 2, characterized in that at least one liquid inlet for rinsing the sludge is arranged in the sludge channel beneath the intermediate wall.

6. Device according to claim 5, characterized that the inlet for rinsing liquid is connected to the outlet from the lamella separator unit.

7. Device according to claim 1, characterized in that an upper secondary outlet is arranged in the primary separation zone of the tank.

* * * * *